United States Patent [19]

Yang et al.

[11] Patent Number: 4,895,339
[45] Date of Patent: Jan. 23, 1990

[54] DETACHABLE SWIVELLING STRUCTURE

[76] Inventors: Chen Yang, 3th Fl., 21, Lane 20, Chung Cheng North Rd., San Chung City, Taipei Hsien; Chu Ven-Chung, 3th Fl., 3, Lane 42, Yu Hsi St., Yung Ho City, Taipei Hsien, both of Taiwan

[21] Appl. No.: 240,092

[22] Filed: Sep. 2, 1988

[51] Int. Cl.⁴ .......................................... F16M 13/00
[52] U.S. Cl. .................................................... 248/522
[58] Field of Search ............... 248/511, 519, 521, 522, 248/523

[56] References Cited

U.S. PATENT DOCUMENTS

| | | | |
|---|---|---|---|
| 626,514 | 6/1899 | Wagner | 248/522 |
| 2,005,293 | 6/1935 | Harris | 248/522 |
| 2,416,802 | 3/1947 | Roung | 248/522 |
| 2,469,884 | 5/1949 | Masone | 248/522 |
| 2,485,460 | 10/1949 | Rocco | 248/522 |
| 2,527,969 | 10/1950 | Siebenkittel | 248/522 |
| 2,568,995 | 9/1951 | Eckhardt | 248/522 |
| 2,587,788 | 3/1952 | Tacy | 248/522 |
| 2,825,255 | 3/1958 | Kuehni | 248/522 |
| 3,017,150 | 1/1962 | Kuehle | 248/522 |
| 3,042,350 | 7/1962 | Lencioni | 248/522 |

FOREIGN PATENT DOCUMENTS

| | | | |
|---|---|---|---|
| 582613 | 9/1959 | Canada | 248/522 |
| 535396 | 9/1931 | Fed. Rep. of Germany | 248/522 |

Primary Examiner—Alvin C. Chin-Shue
Assistant Examiner—Robert A. Olson
Attorney, Agent, or Firm—Balogh, Osann, Kramer, Dvorak, Genova & Traub

[57] ABSTRACT

It is a detachable swivelling structure, which is particular a swivelling structure for mounting a swivelling Christmas tree. The swivelling structure comprises a round base, four supporting legs to be assembled at a perpendicular angle one another or disassembled, a lid, and a turning base. After the four supporting legs being assembled together, they are mounted under the round base so as to have a larger base to hold the swivelling tree in a stable manner.

2 Claims, 4 Drawing Sheets

DETACHABLE SWIVELLING STRUCTURE

BACKGROUND OF THE INVENTION

There are many articles to stand on ground by means of a base. The higher the article, the larger the base should be.

In the past, the base for a Christmas tree is usually made in a detachable manner, i.e., several parts being made separately before being assembled together by means of tenons and mortises. Such a detachable base is good for packing and shipping, such as mail-order businesses.

In recent years, a swivelling Christmas tree has become a popular requirement so as to have a rotating Christmas tree to present a variety of views. The conventional base for a Christmas tree is usually too small to accommodate a driving device, and, therefore, cannot meet such requirement. In the conventional base, the supporting legs are to be fastened to a sleeve part of the base by means of tenon or tenons. As a result, the supporting legs become loosened from the base. This is particularly true when the Christmas tree is large or disassembled quite often.

In view of the drawback of the conventional base of a Christmas tree, the inventor has, through repeated studies, developed a new detachable swivelling structure, which has sufficient space to mount a driving device, and a set of supporting legs to be fastened together. After the whole base is assembled, it becomes a strong and durable base structure.

SUMMARY OF THE INVENTION

This invention relates to a detachable swivelling structure, and it particularly relates to a swivelling structure for Christmas tree; the swivelling structure comprises a round base, a set of four detachable supporting legs to be perpendicularly assembled, a lid and a turning base. The round base further includes a driving device for driving a turning base. The bottom of the round base is furnished with channels for mounting the supporting legs; the part of each channel near the circumference of the round base is furnished with a movable tenon for positioning the supporting leg in place. Any two supporting legs may be mated together by means of their tenon-and-mortise assembly, and therefore the four supporting legs can be assembled into a strong supporting structure.

DETAILED DESCRIPTION

Figure 1:
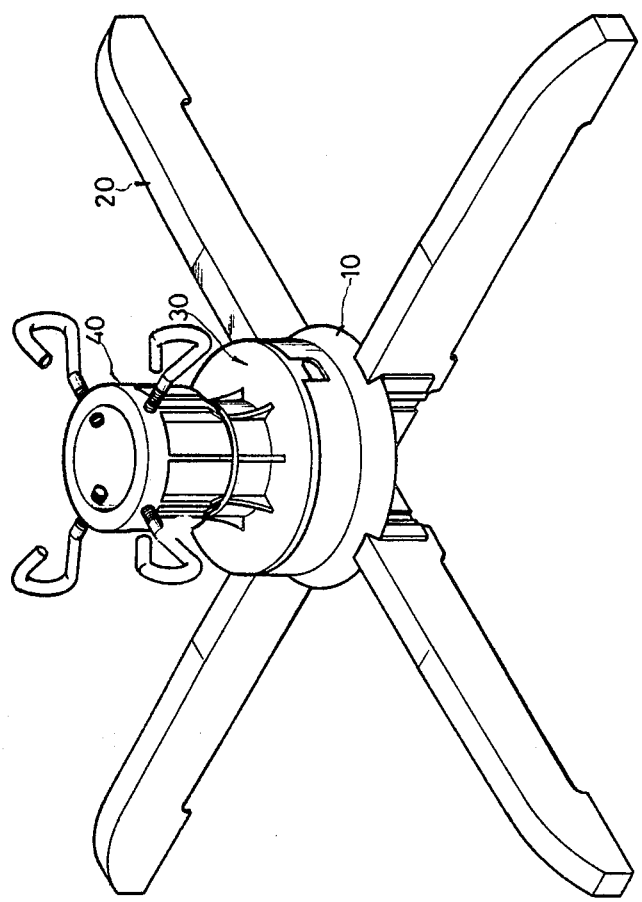
FIG. 1 is a perspective view of an embodiment according to the present invention.
Figure 2:
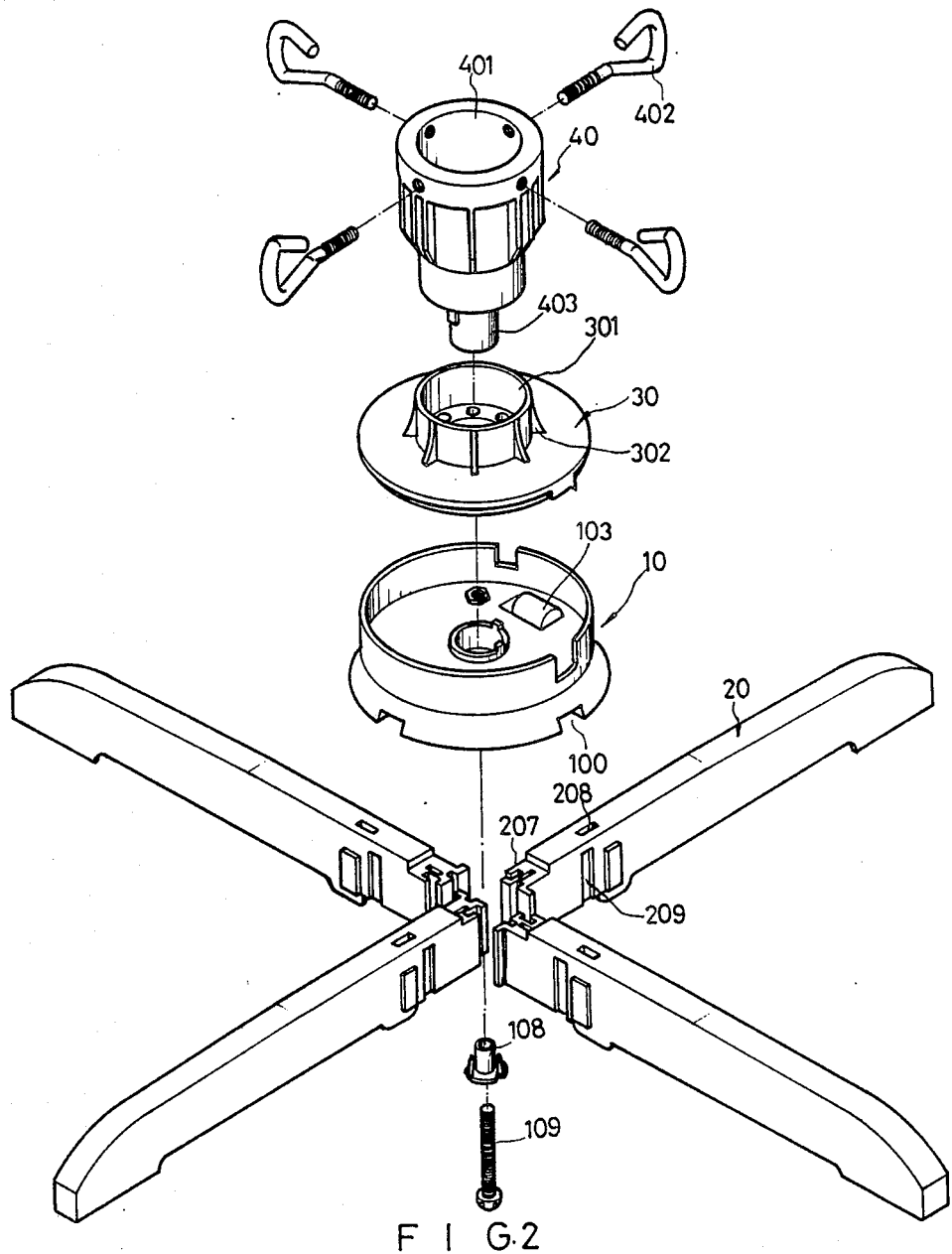
FIG. 2 is a disassembled view of the present invention.
Figure 3:
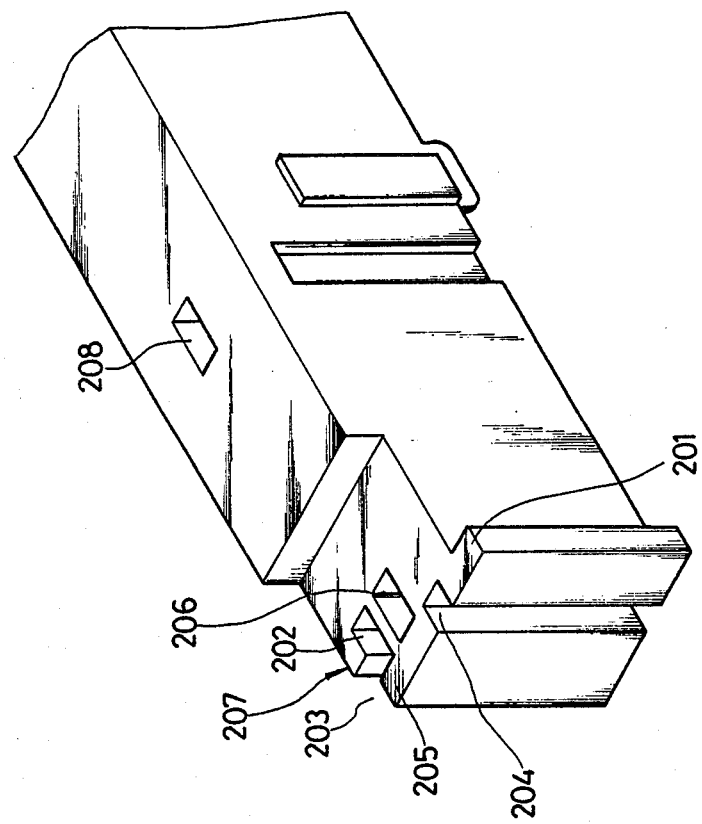
FIG. 3 is a perspective view of the supporting leg according to the present invention.

Referring to FIG. 1, there is illustrated the present invention, a detachable swivelling structure, which mainly comprises a round base 10, a set of four supporting legs 20 to be assembled perpendicularly to one another under the round base, a lid 30 to be fixed on the round base, and a turning base 40. The bottom of the round base 10 as shown in FIG. 2 has two channels 100 formed into a cross, each of channels 100 has two positioning pins 101 and 101' in the vicinity of the center and circumference of the round base 10 respectively. On the both sides of the positioning pin 101, there are two tenons 102 respectively. The round base 10 is mounted with a driving device 103, which can drive the round base 10 and the Christmas tree on the round base 10 to rotate together. FIG. 3 illustrates a perspective view of the supporting leg 20, of which one end is formed into a curved and flat shape, while the other end thereof is furnishd with a tenon-and-mortise assembly 207. Both sides of the other end of the supporting leg 20 have two grooves 209 respectively, and each of the other end has one positioning pin hole 208. The tenon-and-mortises assembly 207 is shown in FIG. 3, is which the left side has a left tenon 201, and the right side has a L-shaped mortise 203 that is extended into the central part of the assembly 207, having an appropriate size to be mated with the left tenon 201; there is also a right tenon 205 being provided between the tenon 202 and the L-shaped mortise 203 and a notch 204. In fact, the notch 204 is so designed that it can exactly mate with the size of the right tenon 205. Further, the central part of the assembly 207 also includes a positioning pin hole 206.

The lid 30 as shown in FIG. 2 has a bush 301 with a plurality of ribs 302 around the outside surface thereof.

In FIG. 2, the turning base 40 is used for mounting a Christmas tree, which is to be fixedly secured inside the base 40 by means of several hook screws 402. The other end of the turning base 40 has a spindle 403 being mounted inside the turning base 40 for receiving driving power from the driving device 103.

Figure 4:
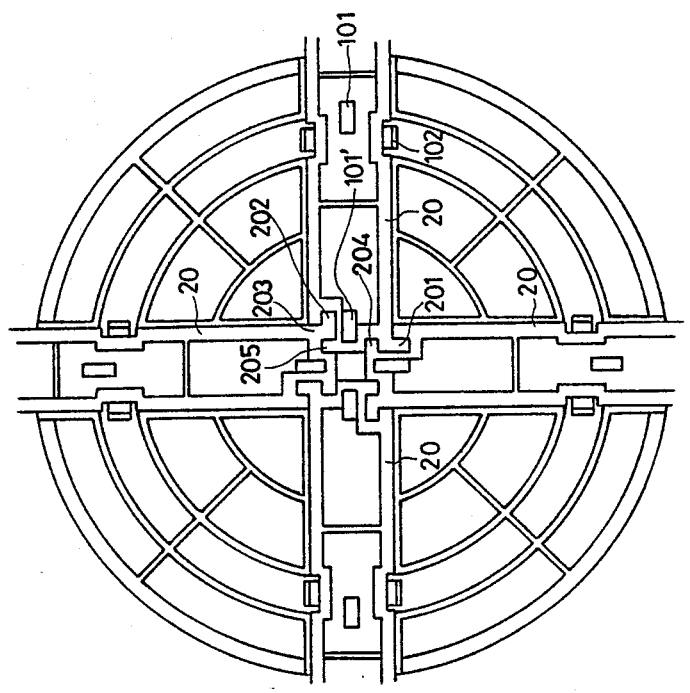
FIG. 4 illustrates a bottom view when the supporting legs of the present invention are assembled together.

To assemble the swivelling structure according to the present invention, the four supporting legs 20 should first be assembled together as shown in FIG. 4, i.e., the left tenon 201 of each supporting leg 20 is mated with the L-shaped mortise 203 of next adjacent supporting leg 20. Simultaneously, the right tenon 205 is mated with the notch 204 of the next supporting leg 20. In other words, each of the supporting legs 20 is to be fastened together with the left and right supporting legs 20 thereof respectively. The four supporting legs 20 so assembled are mounted under the round base 10. Each of the four supporting legs 20 is pressed into the corresponding channel 100 thereof so as to have the movable tenons 102 automatically engaged into the grooves 209 of the supporting legs 20 respectively. Simultaneously, the positioning pins 101 and 101' are mated with the positioning pin holes 208 and 206 respectively. After the four supporting legs 20 are inserted into the round base 10, a screw bolt 109 and a washer 108 are fitted through the supporting legs and the round base 10 so as to fasten them together completely.

Figure 5:
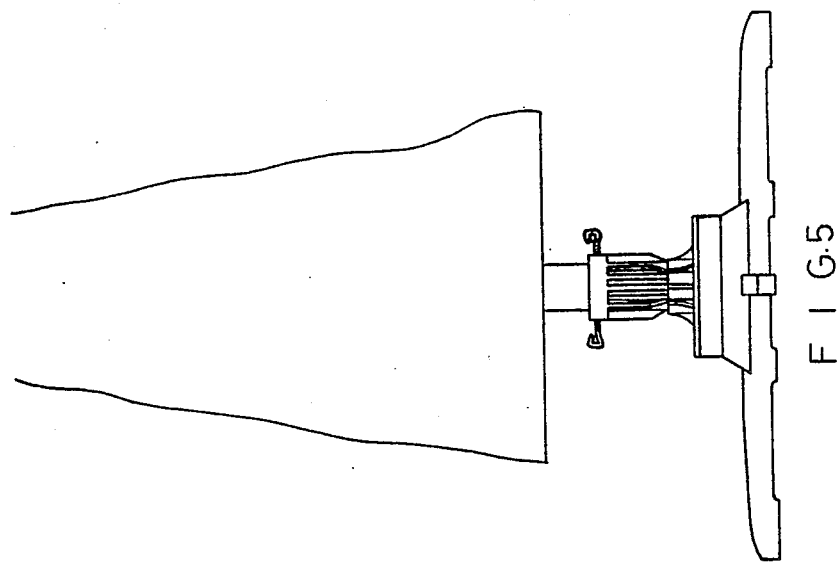
FIG. 5 illustrates the present invention used to support a Christmas tree.

The lid 30 is then mounted on the round base 10, while the turning base 40 is mounted into the bush 301 of the lid 30. Finally, a Christmas tree is inserted into the pivotal sleeve 401 of the turning base 40, and then the hook screws 402 are screwed inward until the tree is fixed in place as shown in FIG. 5.

We claim:

1. A detachable swivelling structure comprising a round base, four supporting legs being perpendicularly engaged together and being secured to said round base, a lid fixed on said round base, the upper portion of said lid fixedly mounting a bush, a series of ribs spaced around the periphery of said bush for rendering stability to said bush mounted on said round base, a turning base swivellingly secured in said bush, the bottom of said round base being provided with two channels disposed into a cross, and each of said channels being provided with two positioning pins, one of said pins being located near the circumference of said round base, while the other pin is located near the center of said round base, both sides of said positioning pin near the circumference of said round base having two movable tenons, respectively, a driving device being mounted inside said round base for driving said turning base, each of said supporting legs having a free end formed into a curved shape, while the other end of such supporting leg is provided with a tenon-and-mortise assembly, lateral sides of each of said supporting legs being provided with two vertical grooves, each of said supporting legs being furnished with a positioning pin hole, the upper portion of said turning base defining a pivotal sleeve provided with a number of transversely threaded openings, a corresponding number of hook screws passing through said openings for fastening a Christmas tree in said turning base, the lower portion of said turning base having a spindle for receiving driving power from said driving device.

2. A detachable swivelling structure as claimed in claim 1, wherein said tenon-and-mortise assembly of each supporting leg comprises a left tenon, a L-shaped mortise having the same shape as that of said left tenon, a right tenon, and a notch beside said left tenon having the same size as that of said right tenon; and a positioning pin hole being provided in the central part of said tenon-and-mortise assembly.

* * * * *